US008140785B2

(12) United States Patent
Kalos et al.

(10) Patent No.: US 8,140,785 B2
(45) Date of Patent: Mar. 20, 2012

(54) UPDATING METADATA IN A LOGICAL VOLUME ASSOCIATED WITH A STORAGE CONTROLLER FOR DATA UNITS INDICATED IN A DATA STRUCTURE

(75) Inventors: Matthew J. Kalos, Tucson, AZ (US); Robert Akira Kubo, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 11/427,743

(22) Filed: Jun. 29, 2006

(65) Prior Publication Data
US 2008/0005146 A1    Jan. 3, 2008

(51) Int. Cl.
G06F 12/00 (2006.01)
G06F 13/00 (2006.01)
G06F 13/28 (2006.01)

(52) U.S. Cl. ........................................................ 711/161
(58) Field of Classification Search .................... 711/161
See application file for complete search history.

(56) References Cited

U.S. PATENT DOCUMENTS

| | | | |
|---|---|---|---|
| 5,680,640 A | 10/1997 | Ofek et al. | |
| 6,557,089 B1 | 4/2003 | Reed et al. | |
| 6,618,794 B1 | 9/2003 | Sicola et al. | |
| 6,708,265 B1 | 3/2004 | Black | |
| 6,732,244 B2 | 5/2004 | Ashton et al. | |
| 6,799,258 B1 * | 9/2004 | Linde ............................ | 711/162 |
| 6,832,289 B2 | 12/2004 | Johnson | |
| 2002/0112022 A1 | 8/2002 | Kazar et al. | |
| 2004/0039891 A1 * | 2/2004 | Leung et al. .................. | 711/165 |
| 2004/0107176 A1 * | 6/2004 | Fuente et al. ..................... | 707/1 |
| 2004/0215878 A1 * | 10/2004 | Takata et al. ................... | 711/202 |
| 2004/0250021 A1 | 12/2004 | Honda et al. | |
| 2004/0250022 A1 | 12/2004 | Jarvis et al. | |
| 2004/0260735 A1 | 12/2004 | Martinez | |
| 2004/0267706 A1 | 12/2004 | Springer, Sr. et al. | |
| 2005/0033748 A1 | 2/2005 | Kazar et al. | |

(Continued)

OTHER PUBLICATIONS

US Patent Application entitled "Relocating a Logical Volume from a First Storage Location to a Second Storage Location using a Copy Relationship", filed Jun. 28, 2006, U.S. Appl. No. 11/427,732.

(Continued)

*Primary Examiner* — Kevin L Ellis
*Assistant Examiner* — Chad L Davidson
(74) *Attorney, Agent, or Firm* — David W. Victor; Konrad Raynes & Victor LLP

(57) ABSTRACT

Provided are a method, system, and article of manufacture for updating metadata in a logical volume associated with a storage controller. A data structure is generated indicating data units in a volume whose metadata is to be updated. An operation is initiated to update the metadata for data units indicated in the data structure. Indication is made in the data structure that the metadata for one data unit has been updated in response to updating the metadata for the data unit. An Input/Output (I/O) request is received to one data unit in the volume while the metadata for the data units indicated in the data structure is being updated. A determination is made, in response to the I/O request, from the data structure whether the metadata for the requested data unit was updated. The metadata for the requested data unit is updated in response to determining that the metadata for the requested data unit has not been updated. The I/O request is executed against the requested data unit.

26 Claims, 4 Drawing Sheets

Copy Relationship

U.S. PATENT DOCUMENTS

| | | | |
|---|---|---|---|
| 2005/0050110 | A1 | 3/2005 | Sawdon et al. |
| 2005/0076070 | A1* | 4/2005 | Mikami .................... 707/204 |
| 2005/0108263 | A1 | 5/2005 | Cabrera et al. |
| 2006/0107010 | A1* | 5/2006 | Hirezaki et al. ............ 711/165 |
| 2006/0218203 | A1* | 9/2006 | Yamato et al. ............. 707/200 |
| 2007/0101082 | A1* | 5/2007 | Sugiura et al. ............. 711/165 |

OTHER PUBLICATIONS

Document dated Oct. 10, 2008 re China Patent Office art.

First Office Action dated Jun. 9, 2008, pp. 1-16, for U.S. Appl. No. 11/427,732, filed Jun. 29, 2006, by inventors R.A. Kubo, et al.

Response dated Sep. 9, 2008, pp. 1-12, to First Office Action dated Jun. 9, 2008, pp. 1-16, for U.S. Appl. No. 11/427,732, filed Jun. 29, 2006, by inventors R.A. Kubo, et al.

Second Office Action dated Dec. 12, 2008, pp. 1-17, for U.S. Appl. No. 11/427,732, filed Jun. 29, 2006, by inventors R.A. Kubo, et al.

Response dated Mar. 13, 2009 pp. 1-16, to Second Office Action dated Dec. 12, 2008, pp. 1-17, for U.S. Appl. No. 11/427,732, filed Jun. 29, 2006, by inventors R.A. Kubo, et al.

Final Office Action dated Jul. 29, 2009, pp. 1-34, for U.S. Appl. No. 11/427,732, filed Jun. 29, 2006, by inventors R.A. Kubo, et al.

Response dated Oct. 23, 2009, pp. 1-19, to Final Office Action dated Jul. 29, 2009, pp. 1-34, for U.S. Appl. No. 11/427,732, filed Jun. 29, 2006, by inventors R.A. Kubo, et al.

Fourth Office Action dated Mar. 25, 2010, pp. 1-20, for U.S. Appl. No. 11/427,732, filed Jun. 29, 2006, by inventors R.A. Kubo, et al.

Response dated Jun. 30, 2010, pp. 1-19, to Fourth Office Action dated Mar. 25, 2010, pp. 1-20, for U.S. Appl. No. 11/427,732, filed Jun. 29, 2006, by inventors R.A. Kubo, et al.

Notice of Allowance dated Aug. 16, 2010, pp. 1-6, for U.S. Appl. No. 11/427,732, filed Jun. 29, 2006, by inventors R.A. Kubo, et al.

Second Notice of Allowance dated Dec. 9, 2010, pp. 1-10, for U.S. Appl. No. 11/427,732, filed Jun. 29, 2006, by inventors R.A. Kubo, et al.

* cited by examiner

UPDATING METADATA IN A LOGICAL VOLUME ASSOCIATED WITH A STORAGE CONTROLLER FOR DATA UNITS INDICATED IN A DATA STRUCTURE

BACKGROUND OF THE INVENTION

1. Field of the Invention

The present invention relates to a method, system, and program for updating metadata in a logical volume associated with a storage controller.

2. Description of the Related Art

In a network computing environment, host systems may communicate Input/Output ("I/O") requests to a storage controller that manages access to storage systems having the underlying data subject to the I/O request. The storage controller may configure the storage space into logical volumes, such as Logical Unit Numbers (LUNs), partitions, etc., that are presented to the host systems to use. The hosts then direct I/O requests to addressable locations in the logical volumes. The storage controllers execute the I/O requests against the addressable locations in the storage for the hosts. Users of enterprise level storage controllers, also known as enterprise storage servers, expect high availability and continuous access to the data managed by the enterprise server.

During operations, the systems administrator may desire to move logical volumes in storage devices to a new storage array for use with new or different storage controller. For instance, the administrator may need to transfer all volumes to a new storage array managed by a different storage controller. In prior art systems, the administrator would perform a copy operation to physically copy the data from the source storage array to the target storage array and new storage controller. While the data is copied, the new storage controller managing the target storage array would generate metadata for the data and assign the new volume to a logical volume number determined by the new storage controller.

This migration operation involves substantial time to physically copy the data. Further, in many systems, the data may be unavailable as it is being transferred to the new storage controller.

There is a need in the art for improved techniques for assigning a logical volume to a new storage controller.

SUMMARY

Provided are a method, system, and article of manufacture for updating metadata in a logical volume associated with a storage controller. A data structure is generated indicating data units in a volume whose metadata is to be updated. An operation is initiated to update the metadata for data units indicated in the data structure. Indication is made in the data structure that the metadata for one data unit has been updated in response to updating the metadata for the data unit. An Input/Output (I/O) request is received to one data unit in the volume while the metadata for the data units indicated in the data structure is being updated. A determination is made, in response to the I/O request, from the data structure whether the metadata for the requested data unit was updated. The metadata for the requested data unit is updated in response to determining that the metadata for the requested data unit has not been updated. The I/O request is executed against the requested data unit.

DETAILED DESCRIPTION

Figure 1:
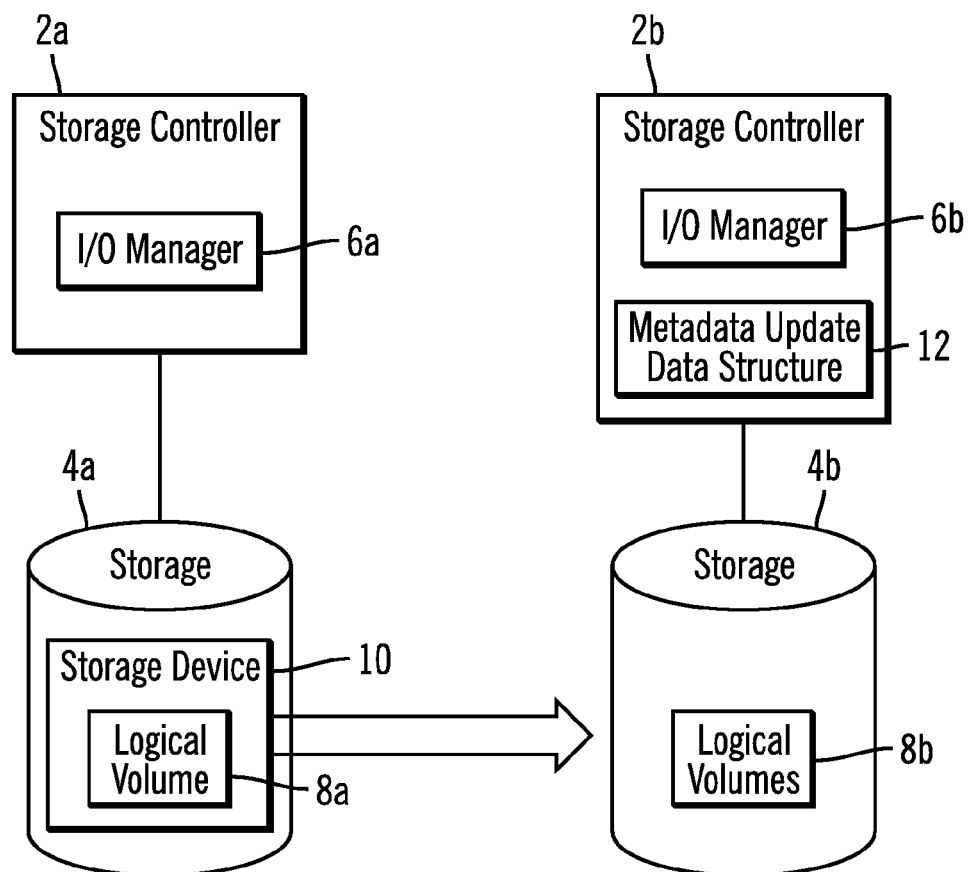
FIG. 1 illustrates an embodiment of a computing environment.

FIG. 1 illustrates an embodiment of a computing environment. A plurality of hosts (not shown) may submit Input/Output (I/O) requests to storage controllers 2a, 2b that manage access to data in storages 4a, 4b, respectively. The storage controllers 2a, 2b each include an I/O manager 6a, 6b that has code executed to manage I/O operations with respect to the storages 4a, 4b. Each storage 4a, 4b is configured with one or more logical volumes 8a, 8b, e.g., Logical Unit Numbers (LUNs), logical devices, logical drives, virtual disks, etc.

The storage controllers 2a, 2b may comprise storage controllers or servers known in the art, such as the International Business Machines (IBM) Enterprise Storage Server (ESS)® (Enterprise Storage Server is a registered trademark of IBM) or storage servers from other vendors. Alternatively, the storage controllers 2a, 2b may comprise a lower-end storage server as opposed to a high-end enterprise storage server. The storages 4a, 4b may comprise separate storage devices, such as an array of storage devices, Just a Bunch of Disks (JBOD), Direct Access Storage Device (DASD), Redundant Array of Independent Disks (RAID) array, virtualization device, tape storage, flash memory, etc. Alternatively, the storages 4a, 4b may comprise portions of a single storage device.

FIG. 1 shows the storage 4a having one or more storage devices 10 including a logical volume 8a. A logical volume or volume comprises a logical division of storage known in the art, such as a logical volume, a Logical Unit Number (LUN), a logical partition, a logical device, a logical drive, and a virtual disks, etc. The storage device 10 having the logical volume 8a may be migrated to the storage 4b for use with the storage controller 2b. To import the storage device 10 and logical volume 8a therein for use with storage controller 2b, the identifier or number of the logical volume 8a may have to be changed to be different from the identifiers for the logical volumes 8b already configured for use with the storage controller 2b. In changing the volume identifier of the logical volume 8a being assigned for use with the storage controller 2b, the metadata of the data units in the logical volume 8a may have to be updated to reflect the logical volume number identifier assignment for use with storage controller 2b and to reflect other information changed as a result of being used with storage controller 2b.

To incorporate the storage device 10 and logical volume 8a into the storage 4b for storage controller 2b, the I/O manager 6b establishes a metadata update data structure 12 with respect to the logical volume 8a that is being imported for use with storage controller 2b, which indicates those data units in the logical volume 8a whose metadata has been updated or has not been updated.

In one embodiment, the metadata update data structure 12 comprises a virtual point-in-time copy relationship, where both the source and target volumes of the copy relationship point to the same physical location of the logical volume 8a. The point-in-time copy procedure is modified so that the background copy operation does not copy the data, but instead updates the metadata for the data units, such as the volume information. The data subject to the copy relationship may comprise an extent of multiple sequential tracks or a single track (or fixed block). In this way, the metadata is updated without physically moving the data units.

Figure 2:
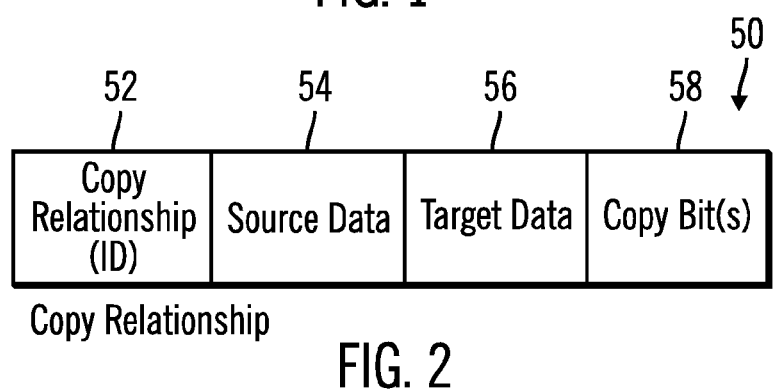
FIG. 2 illustrates copy relationship information for one copy relationship.

FIG. 2 illustrates an embodiment of the metadata update data structure 12 implemented as a copy relationship 50, including a copy relationship identifier 52; the source data 54 and target data 56 both identifying the same logical volume 8a; and a copy bit 58 for each data unit, such as a track, fixed block, extent of tracks or blocks, etc., in the logical volume 8a being moved to storage 4b for use with storage controller 2b. The copy relationship 50 may be maintained in one or more data structures. For instance, the copy bits 58 for the data units may be maintained in a separate data structure, such as a bit map data structure, from the information on the source 54 and target 56 of the volume. In alternative embodiments, data structures other than those used for a point-in-time copy relationship may be used to indicate the data units in a logical volume 8a whose metadata is to be updated.

Figure 3:
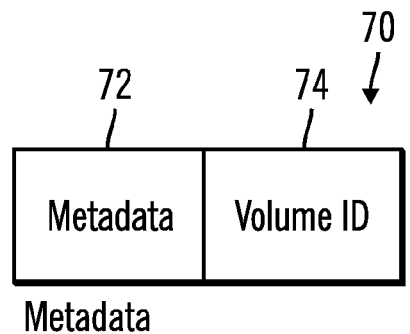
FIG. 3 illustrates an embodiment of metadata.

FIG. 3 illustrates an embodiment of metadata 70 for the data units in the logical volume 8a, which includes one or more metadata fields 72 and one volume identifier (ID) 74 identifying the volume in which the corresponding data unit is stored.

Figure 4:
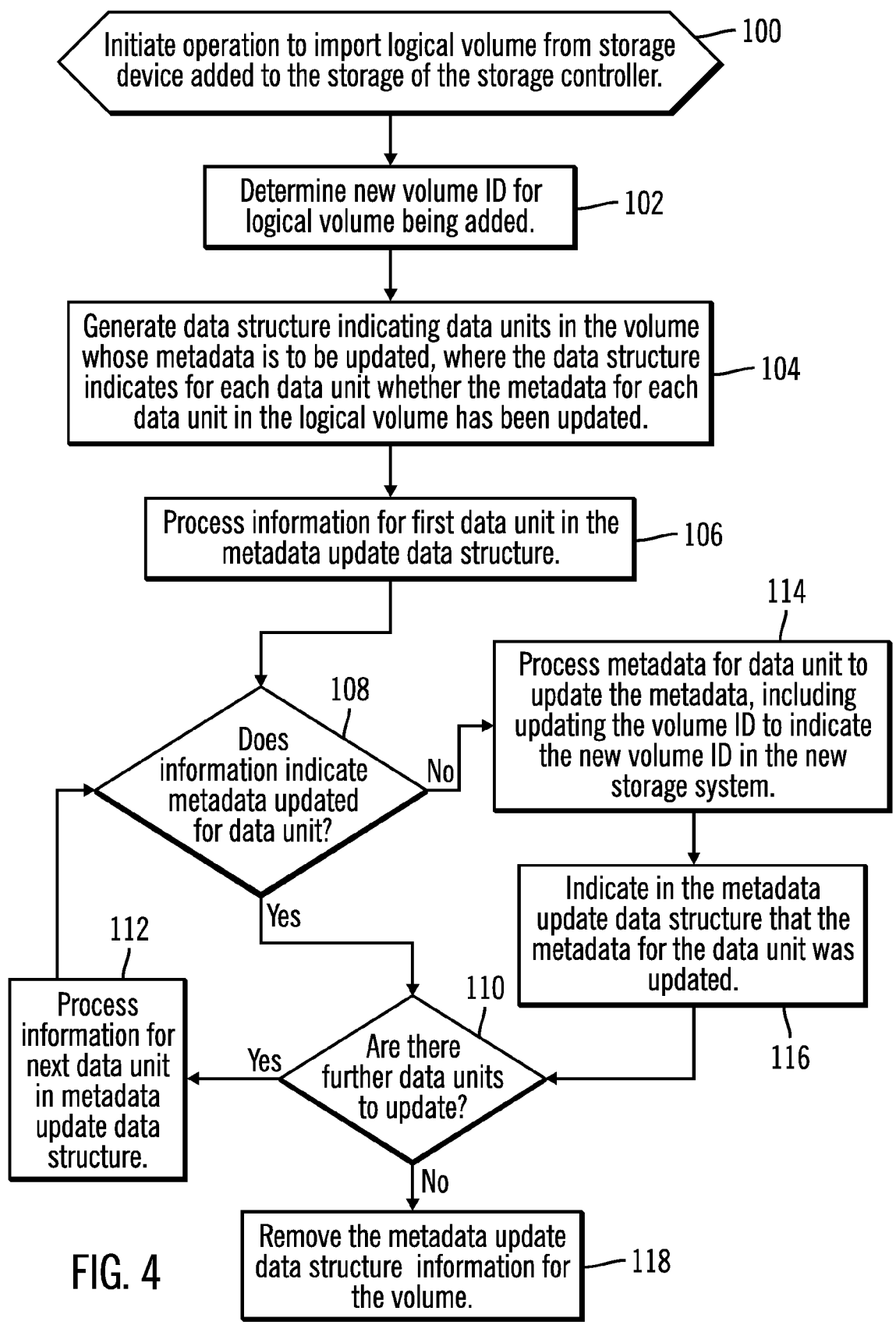
FIG. 4 illustrates an embodiment of operations to initiate an operation to update the metadata for a logical volume.

FIG. 4 illustrates an embodiment of operations implemented by the I/O manager 6b to configure the logical volume 8a for use with the storage controller 2b. The operations of FIG. 4 may be initiated by a system administrator when adding the storage device 10 and logical volume 8a to the storage 4b. Alternatively, the operations of FIG. 4 may be automatically initiated by the I/O manager 6b upon detecting the addition of the storage device 10 and logical volume 8a to the storage 4b. Upon initiating (at block 100) the operations to import the logical volume 8a for use with storage controller 2b, the I/O manager 6b determines (at block 102) a new volume identifier or number for the logical volume 8a being imported. The determined new volume identifier may comprise an identifier different from the identifiers for the logical volumes 8b already configured for use with the storage controller 2b, e.g., the next sequential integer number following the highest volume number of the volumes 8b. The I/O manager 6b generates (at block 104) a metadata update data structure 12 indicating data units whose metadata must be updated. In an embodiment where the metadata update data structure 12 comprises a copy relationship 50, the copy bits 58 may indicate for each data unit whether the metadata for that data unit in the logical volume has been updated. The I/O manager 6 starts the operation of updating metadata for the data units in the logical volume 8a by processing (at block 106) the metadata update information for the first data unit in the metadata update data structure 12, e.g., the first copy bit 58. If (at block 108) the metadata update information indicates that the metadata for the data unit has been updated and if (at block 110) there are further data units whose metadata update information needs to be processed, e.g., further copy bits 58 to consider, then the I/O manager 6 processes (at block 112) the metadata update information for the next data unit, e.g., the next copy bit 58, and returns to block 108 to determine whether to update the metadata for the next considered data unit.

If (at block 108) the metadata update information being processed indicates that the metadata for the corresponding data unit has not been updated, then the I/O manager 6 processes (at block 114) the metadata 70 for the data unit to update the metadata 70, including updating the volume ID 74 to indicate the determined new volume ID used by the storage controller 2b. The I/O manager 6b indicates (at block 118) in the metadata update data structure 12 that the metadata 70 for the data unit is updated, e.g., setting the copy bit 58. From block 116, the I/O manager 6b proceeds to block 110 to determine whether there is further metadata 70 to update. After updating all metadata for data units indicated in the metadata update data structure 12, e.g., copy bits 58, the I/O manager 6b removes (at block 118) the metadata update data structure 12, e.g., point-in-time copy relationship 50, for the volume.

With the operations of FIG. 4, once the background metadata update operation completes, the metadata 70 for the data units in logical volume 8a is updated to indicate the new status of the logical volume 8a in the storage 4b. In this way, the logical volume 8a in the imported storage device 10 is incorporated for use with the storage controller 2b without having to physically copy the data units.

Figure 5:
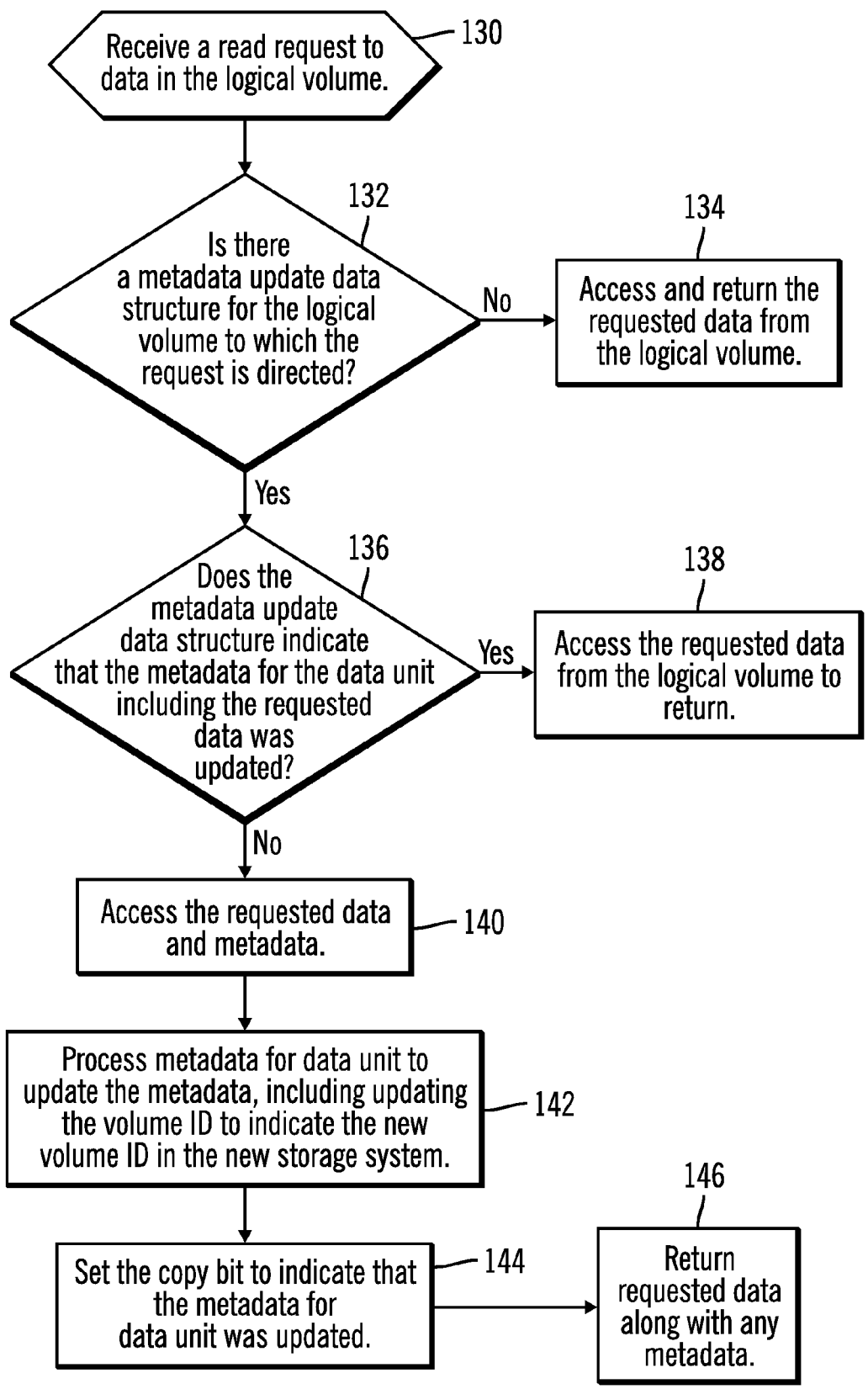
FIG. 5 illustrates an embodiment of operations to process a read request to a logical volume subject to metadata updating.

FIG. 5 illustrates an embodiment of operations performed by the I/O manager 6 to process a read request to data in a logical volume. Upon receiving (at block 130) the read request, if (at block 132) there is no metadata update data structure 12 for the logical volume subject to the read request, then the data is accessed (at block 134) from the logical volume to return to the request. If there is no metadata update data structure 12, then the logical volume is not subject to an in-progress metadata update operation. In one embodiment where the metadata update data structure 12 comprises a copy relationship 50 (FIG. 2), the I/O manager 6b may determine the presence of a copy relationship by determining whether the logical volume 8 to which the request is directed is the source data 54 (FIG. 2) in a copy relationship 50. Other flags and indicators may be used to signal that a particular logical volume is subject to an active metadata update operation. If (at block 132) there is an active metadata update data structure 12 for the logical volume 8a, i.e., the logical volume 8a is subject to an ongoing metadata update operation, then the I/O manager 6b determines (at block 136) whether the metadata update data structure 12 indicates that the metadata 70 for the data unit including the requested data was updated. In embodiments where the metadata update data structure 12 comprises a copy relationship 50, this determination may be made by checking whether the copy bit 58 (FIG. 2) for the data unit subject to the read request indicates that the requested data unit has been copied, i.e., the metadata was updated.

If (at block 136) the metadata for the data unit was updated, then the I/O manager 6 accesses (at block 138) the requested data from the logical volume 8a to return to the request. Otherwise, if (at block 136) the metadata 70 for the requested data unit has not been updated, then the metadata 70 for the requested data unit is accessed (at block 140). The I/O manager 6b processes (at block 142) the metadata 70 for the requested data unit to update the metadata, including updating the volume ID 74 to indicate the determined new volume ID in the new storage system. The metadata update information for the data unit, e.g., the copy bit 58, is set (at block 144) to indicate that the metadata 70 for the data unit was updated and the requested data is returned (at block 146).

Figure 6:
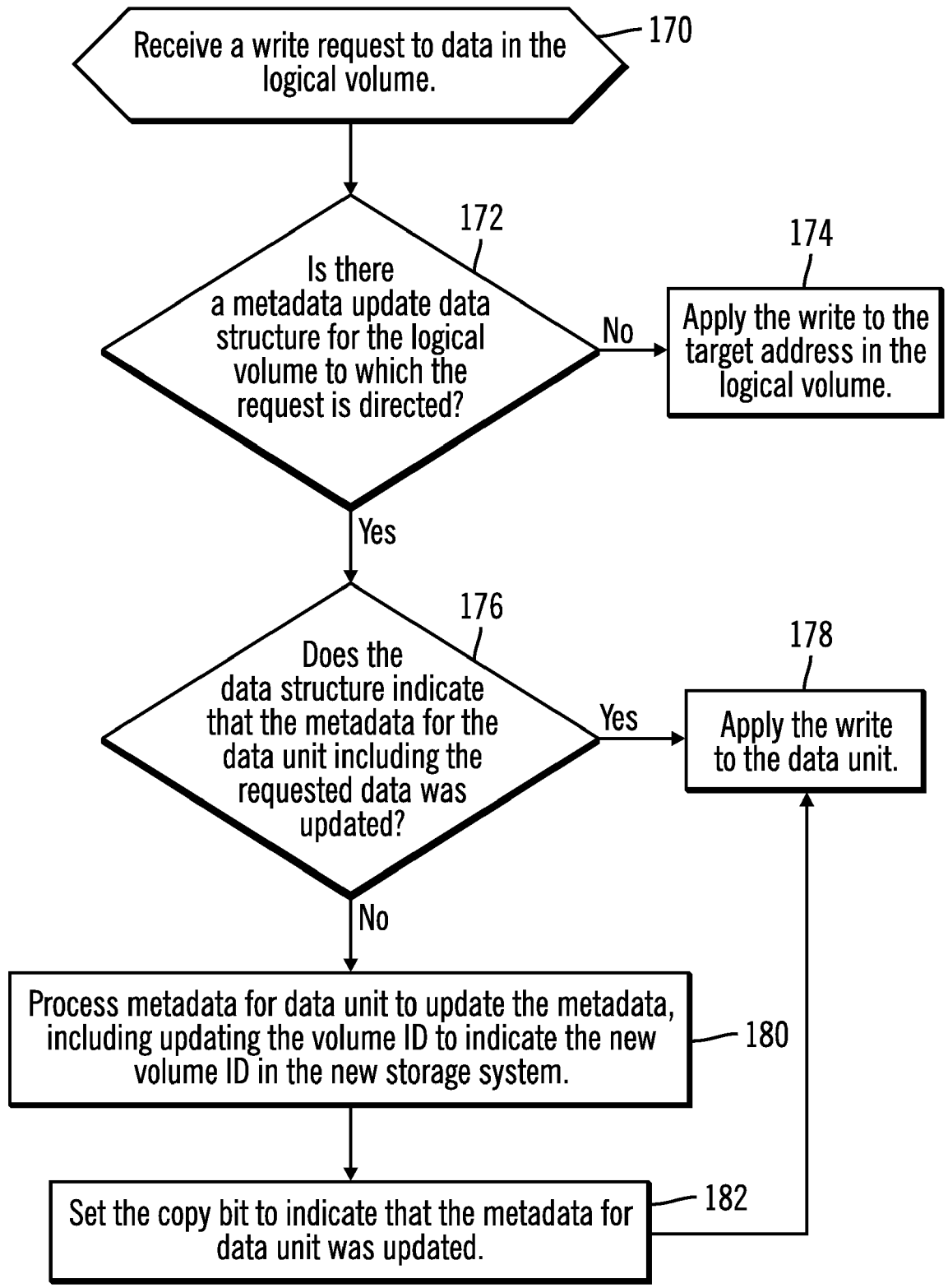
FIG. 6 illustrates an embodiment of operations to process a write request to a logical volume subject to metadata updating.

FIG. 6 illustrates an embodiment of operations performed by the I/O manager 6b to process a write request to one or more data units in the imported logical volume 8a. Upon receiving (at block 170) the write request, if (at block 172) there is no metadata update data structure 12 for the logical volume 8a subject to the write request, then the write is applied (at block 174) to the target address in the logical volume 8a. In embodiments where the data structure 12 comprises a copy relationship 50, the I/O manager 6b may determine the presence of a relationship by determining whether the logical volume 8 to which the request is directed is the source data 54 (FIG. 2) in a copy relationship 12 If (at block 172) there is an active metadata update data structure 12 for the logical volume 8*a*, i.e., the logical volume 8*a* is subject to an ongoing metadata update operation, and if (at block 176) the metadata update data structure 12 indicates that the metadata 70 for the data unit including the requested data was updated, then the write is applied (at block 178) to the target data unit.

If (at block 176) the metadata update data structure 50 indicates for the data unit that the metadata has not been updated, then the I/O manager 6*b* processes (at block 180) the metadata 70 for the data unit to update the metadata, including updating the volume ID 74 to indicate the determined new volume ID in the new storage controller 2*b*. After updating the metadata for the data unit, the I/O manager 6*b* indicates that the metadata was updated, e.g., set (at block 182) the copy bit 58.

In one embodiment, the I/O manager executes code that performs the metadata updating and I/O request handling operations of FIGS. 4, 5, and 6. In embodiments where a virtual point-in-time copy operation is used to establish the metadata to update, then the point-in-time copy operation program may be modified to update metadata only without copying data when the source 54 and target 56 fields identify the same logical volume 8*a*. Further, a user or another program involved in the importation of the logical volumes 8*a* may instruct the point-in-time copy program to update metadata and not copy the actual data when establishing the copy relationship data structure 50. The point-in-time copy operation program may include program instructions to update metadata without copying the data when so instructed.

With the described embodiments, the I/O manager allows the storage controller to provide hosts continued access to logical volumes imported into the storage space managed by the storage controller while the storage controller is updating the metadata for the imported logical volumes.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4, 5, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
generating a data structure indicating data units in a volume whose metadata is to be updated;
initiating an operation to update the metadata for the data units indicated in the data structure, wherein updating the metadata comprises modifying a field in the metadata for the data units indicated in the data structure;
indicating in the data structure that the metadata for one of the data units has been updated in response to updating the metadata for the data unit;
receiving an Input/Output (I/O) request to one of the data units in the volume while the metadata for the data units indicated in the data structure is being updated;
determining, in response to the I/O request, from the data structure whether the metadata for the requested data unit was updated;
updating the metadata for the requested data unit in response to determining that the metadata for the requested data unit has not been updated; and
executing the I/O request against the requested data unit.

2. The method of claim 1, wherein the I/O request is executed against the requested data unit in response to updating the metadata for the requested data unit or determining that the data structure indicates that the metadata for the requested data unit has been updated.

3. The method of claim 1, wherein the volume including the data units indicated in the data structure is in a storage device configured for use with a first storage server, further comprising:
associating the volume in the storage device with a second storage server for use with the second storage server.

4. The method of claim 3, wherein associating the volume with the second storage server, comprises:
determining a volume number to assign to the volume for use with the second storage server, wherein the metadata is updated to indicate the determined volume number for the volume.

5. The method of claim 1, wherein the data structure comprises a point-in-time copy relationship indicating the data units in the volume whose metadata is to be updated, wherein the point-in-time copy operation updates the metadata for the indicated data units without copying the data units.

6. The method of claim 5, further comprising:
configuring the copy relationship to have a source and target volumes point to a same physical location, wherein the data units indicated in the copy relationship as not copied from the source volume to the target volume have not had their metadata updated and wherein the data units indicated as copied from the source volume to the target volume have had their metadata updated.

7. The method of claim 1, wherein the I/O request comprises a write request, wherein the metadata is updated before applying the write request in response to determining that the metadata for the requested data unit has not been updated.

8. The method of claim 1, wherein modifying the metadata for the data units indicated in the data structure comprises updating a volume identifier (ID) in the metadata for the data units to indicate a new volume ID for the data units.

9. The method of claim 1, further comprising:
initiating operations to configure a storage device including the data units in the volume previously included in a first storage used by a first storage controller for use in a second storage used by a second storage controller, wherein the field in the metadata for the data units indicates a first volume identifier used to identify the volume to the first storage controller; and
determining a second volume identifier assigned by the second storage controller to the volume identified by the first volume identifier in the storage device included in the second storage, wherein updating the field in the metadata for the requested data unit comprises indicating in the field that the volume of the requested data unit is identified by the second volume identifier.

10. The method of claim 1, wherein the I/O request comprises a read request, wherein the metadata is updated before returning the requested data unit in response to determining that the metadata for the requested data unit has not been updated.

11. A system, comprising:
a computer readable storage medium including a data structure indicating data units in a volume whose metadata is to be updated; and
an Input/Output (I/O) manager executed to perform operations, the operations comprising:
generating the data structure indicating the data units in the volume whose metadata is to be updated;
initiating an operation to update the metadata for the data units indicated in the data structure, wherein updating the metadata comprises modifying a field in the metadata for the data units indicated in the data structure;
indicating in the data structure that the metadata for one of the data units has been updated in response to updating the metadata for the data unit;
receiving an Input/Output (I/O) request to one of the data units in the volume while the metadata for the data units indicated in the data structure is being updated;
determining, in response to the I/O request, from the data structure whether the metadata for the requested data unit was updated;
updating the metadata for the requested data unit in response to determining that the metadata for the requested data unit has not been updated; and
executing the I/O request against the requested data unit.

12. The system of claim 11, wherein the data structure comprises a point-in-time copy relationship indicating the data units in the volume whose metadata is to be updated, wherein the point-in-time copy operation updates the metadata for the indicated data units without copying the data units.

13. The system of claim 12, wherein the operations further comprise:
configuring the copy relationship to have a source and target volumes point to a same physical location, wherein the data units indicated in the copy relationship as not copied from the source volume to the target volume have not had their metadata updated and wherein the data units indicated as copied from the source volume to the target volume have had their metadata updated.

14. The system of claim 11, wherein the I/O request comprises a write request, wherein the metadata is updated before applying the write request in response to determining that the metadata for the requested data unit has not been updated.

15. The system of claim 11, wherein modifying the metadata for the data units indicated in the data structure comprises updating a volume identifier (ID) in the metadata for the data units to indicate a new volume ID for the data units.

16. The system of claim 11, wherein the volume is included in a storage device previously included in a first storage used by a first storage controller, further comprising:
a second storage controller;
a second storage used by the second storage controller including the I/O manager, wherein the operations performed by the I/O manager further comprise:
initiating operations to configure the storage device including the data units in the volume for use in the second storage, wherein the field in the metadata for the data units indicates a first volume identifier used to identify the volume to the first storage controller; and
determining a second volume identifier assigned by the second storage controller to the volume identified by the first volume identifier in the storage device included in the second storage, wherein updating the field in the metadata for the requested data unit comprises indicating in the field that the volume of the requested data unit is identified by the second volume identifier.

17. The system of claim 11, wherein the I/O request comprises a read request, wherein the metadata is updated before returning the requested data unit in response to determining that the metadata for the requested data unit has not been updated.

18. The system of claim 11, wherein the I/O request is executed against the requested data unit in response to updating the metadata for the requested data unit or determining that the data structure indicates that the metadata for the requested data unit has been updated.

19. An article of manufacture comprising a computer readable storage medium including code executed by a processor to perform operations, the operations comprising:
generating a data structure indicating data units in a volume whose metadata is to be updated;
initiating an operation to update the metadata for the data units indicated in the data structure, wherein updating the metadata comprises modifying a field in the metadata for the data units indicated in the data structure;
indicating in the data structure that the metadata for one of the data units has been updated in response to updating the metadata for the data unit;
receiving an Input/Output (I/O) request to one of the data units in the volume while the metadata for the data units indicated in the data structure is being updated;
determining, in response to the I/O request, from the data structure whether the metadata for the requested data unit was updated;
updating the metadata for the requested data unit in response to determining that the metadata for the requested data unit has not been updated; and
executing the I/O request against the requested data unit.

20. The article of manufacture of claim 19, wherein the data structure comprises a point-in-time copy relationship indicating the data units in the volume whose metadata is to be updated, wherein the point-in-time copy operation updates the metadata for the indicated data units without copying the data units.

21. The article of manufacture of claim 20, wherein the operations further comprise:
configuring the copy relationship to have a source and target volumes point to a same physical location, wherein the data units indicated in the copy relationship as not copied from the source volume to the target volume have not had their metadata updated and wherein the data units indicated as copied from the source volume to the target volume have had their metadata updated.

22. The article of manufacture of claim 19, wherein the I/O request comprises a write request, wherein the metadata is updated before applying the write request in response to determining that the metadata for the requested data unit has not been updated.

23. The article of manufacture of claim 19, wherein modifying the metadata for the data units indicated in the data structure comprises updating a volume identifier (ID) in the metadata for the data units to indicate a new volume ID for the data units.

24. The article of manufacture of claim 19, wherein the volume is included in a storage device previously included in a first storage used by a first storage controller, and wherein the computer readable storage medium is included in a second storage controller using a second storage, wherein the operations further comprise:
initiating operations to configure the storage device including the data units in the volume for use in the second storage, wherein the field in the metadata for the data units indicates a first volume identifier used to identify the volume to the first storage controller; and
determining a second volume identifier assigned by the second storage controller to the volume identified by the first volume identifier in the storage device included in the second storage, wherein updating the field in the metadata for the requested data unit comprises indicating in the field that the volume of the requested data unit is identified by the second volume identifier.

25. The article of manufacture of claim 19, wherein the I/O request comprises a read request, wherein the metadata is updated before returning the requested data unit in response to determining that the metadata for the requested data unit has not been updated.

26. The article of manufacture of claim 19, wherein the I/O request is executed against the requested data unit in response to updating the metadata for the requested data unit or determining that the data structure indicates that the metadata for the requested data unit has been updated.

* * * * *